United States Patent [19]

Hoppie

[11] Patent Number: 4,651,703
[45] Date of Patent: Mar. 24, 1987

[54] METHOD AND APPARATUS FOR ACHIEVING HYPERGOLIC COMBUSTION BY PARTIAL CATALYTIC COMBUSTION

[75] Inventor: Lyle O. Hoppie, Birmingham, Mich.

[73] Assignee: Eaton Corporation, Cleveland, Ohio

[21] Appl. No.: 813,882

[22] Filed: Dec. 26, 1985

[51] Int. Cl.[4] ............................................. F02M 31/16
[52] U.S. Cl. .................................... 123/551; 123/554; 123/48 D
[58] Field of Search ................. 123/48 D, 78 D, 286, 123/543, 550, 551, 554

[56] References Cited

U.S. PATENT DOCUMENTS

| 2,614,546 | 10/1952 | Schwarz | 123/48 D |
| 4,074,661 | 2/1978 | Noguchi et al. | 123/551 X |
| 4,161,164 | 7/1979 | Mühlberg | 123/551 |
| 4,202,300 | 5/1980 | Skay | 123/48 D X |
| 4,448,176 | 5/1984 | Hoppie | 123/558 |

FOREIGN PATENT DOCUMENTS 7808110 2/1980 Netherlands ..................... 123/48 D

OTHER PUBLICATIONS

H. J. Henkel et al, "Autothermal Gasification of Liquid Hydrocarbons by Partial Oxidation", (Siemen Forsch.-u Entiwikl Berlin) Jul. 1977.

G. P. Purohit et al, "Gasification of Diesel Fuel for a Low-Emission, High-Efficiency Engine System", *Society of Automotive Engineers*, Jan. 1980.

W. Frie et al, "Compact Gas Generator for Fuel Gasification Aboard Motor Vehicles", (Siemens AG Forschungslaboratorien, Berlin) Jul. 1978.

Scharnweber et al, "Hypergolic Combustion in an Internal Combustion Engine", *Society of Automotive Engineer*, Mar. 1, 1985.

*Primary Examiner*—Willis R. Wolfe, Jr.
*Attorney, Agent, or Firm*—John R. Benefiel; J. Gordon Lewis

[57] ABSTRACT

An apparatus and method for achieving hypergolic combustion, in which a hydrocarbon fuel is partially combusted by a catalytic reaction to form a high temperature hydrogen-rich product gas, which is directly injected into an oxidizing atmosphere in a combustion chamber while at a temperature sufficiently elevated to enable hypergolic combustion therein. The air-fuel ratios are selected to minimize coke formation at the elevated temperatures of the product gas.

8 Claims, 2 Drawing Figures

METHOD AND APPARATUS FOR ACHIEVING HYPERGOLIC COMBUSTION BY PARTIAL CATALYTIC COMBUSTION

BACKGROUND OF THE INVENTION

1. Field of the Invention

The present invention concerns combustion devices and more particularly a method and apparatus for pretreating hydrocarbon fuel prior to its injection into a combustion chamber to a condition which will subsequently cause hypergolic combustion with only negligible delays in ignition and in completing the combustion process.

2. Description of the Prior Art

It has heretofore been proposed to achieve so called "hypergolic" combustion, particularly of hydrocarbon fuels in an internal combustion engine, such that ignition delay and the time required to complete combustion are both negligible after the fuel is introduced into an oxidizing atmosphere.

For a detailed discussion, see U.S. Pat. No. 4,448,176; SAE paper no. 850089 "Hypergolic Combustion in an Internal Combustion Engine"; and, SAE paper 820356, "The Influence of Initial Fuel Temperature on Ignition Delay".

Hypergolic combustion has a number of advantages, as detailed in the aforementioned references, particularly in the context of internal combustion reciprocating engines.

As also detailed in the aforementioned references, ignition delay is believed to occur due to the need for the fuel molecules to first be dissassociated into radicals in order to combine with oxygen molecules, which themselves must be dissassociated for oxidation to occur. In a typical combustion process, an ignition device such as a spark plug causes a localized increased concentration of fuel radicals in a fuel-air mixture, sufficient for initiation of combustion. The release of heat from that localized combustion in turn causes additional dissassociation of adjacent fuel molecules to enable combustion to progagate through the entire charge of fuel-air mixture.

As discussed in the aforementioned U.S. Pat. No. 4,448,176, if there is a pretreatment of the fuel such as to cause a dissassociation of a critical proportion of molecules in each quantity of fuel, much higher than the proportion occurring at ambient temperatures, there is an "activation" of the fuel yielding substantially instantaneous ignition and combustion.

In order that such an increased, critical proportion of fuel molecules be dissassociated into radicals, energy must be expended to bring this proportion of the fuel molecules to the relatively high energy state corresponding to the dissassociated condition of the fuel molecules.

As described in the aforementioned U.S. Pat. No. 4,448,176, if fuel is heated to relatively elevated temperatures in excess of 1000° F., this causes such critical proportion of fuel molecules to be dissassociated to form radicals, since such proportion of the fuel molecules is thereby brought to a high energy state.

In co-pending application Ser. No. 812,863 filed on Dec. 26, 1985, there is described a method and system for heating of the fuel to such elevated temperatures by a regenerative heat exchange process, in which the fuel is circulated through a vessel disposed directly in the combustion chamber, with the combustion chamber insulated to retain heat therein. This arrangement, when combined with preheating of the fuel, as with an exchanger in the engine exhaust system, is able to heat the fuel to such sufficiently elevated temperatures, that upon injection into the combustion chamber hypergolic combustion will result.

Alternatively, catalysis is utilized to augment the effect of heating to achieve fuel activation.

A disadvantage of regeneratively heating the fuel is the tendency for cracking of the fuel molecules at high temperatures, and the resultant formation of coke, tending to clog the fuel flow passages. It has been discovered that if the fuel is sustained at the elevated temperatures for only very short time periods, this will avoid this problem.

Also, while such aforementioned regenerative heating method and system will efficiently heat the fuel to such elevated temperatures, a relatively complex fuel circulation system is necessitated and the tendency for coke formation is higher due to the longer times required to achieve heating by heat exchange with the products of combustion produced in the prior combustion cycles.

In co-pending application Ser. No. 813,888 filed on Dec. 26, 1986, a method of compressive heating of vaporized fuel is disclosed to achieve activated fuel enabling hypergolic combustion, in which catalysis is alternatively utilized to augment the effect achieved by compression heating alone.

Another method of pretreatment of fuel is disclosed in Ser. No. 446,796, filed on Dec. 3, 1982, now U.S. Pat. No. 4,587,475 in which a corona discharge is utilized to activate fuel passed therethrough prior to combustion, to achieve activation of the fuel molecules by the formation of radicals.

There has also been disclosed in co-pending application Ser. No. 813,892 filed on Dec. 26, 1986, a method of activating fuel by irradiation with ultraviolet radiation to achieve the level of activation of the fuel enabling hypergolic combustion.

In SAE paper 800264 entitled "Gasification of Diesel Fuel for a Low Emission, High Efficiency Engine System"; in Siemens Forsch.-u. Entwickl.-Ber.Bd.6 (1977) Nr. 5, entitled "Autothermal Gasification of Liquid Hydrocarbons by Partial Oxidation"; and Siemens Forsch.-u. Entwickl.-Ber.Bd.7(1978) Nr. 2 entitled "Compact Gas Generator for Fuel Gasification Aboard Motor Vehicles", in each reference there is disclosed a method of gasifying liquid hydrocarbon fuels.

This method involves partial oxidation of the fuel in the presence of a catalyst to form a high temperature gas, rich in hydrogen and hydrocarbon radicals. This gas is described as being useable as a fuel for an internal combustion engine if it is cooled to room temperature and mixed with air as in a conventional spark ignited engine. It was found that partial oxidation using catalysis and the proper air-fuel ratios resulted in elimination or a great reduction in coke formation in the catalytic reactor as well as in the fuel delivery lines.

In the aforementioned processes, however, the heat generated by this partial oxidation is extracted from the hydrogen rich gas prior to its combustion in an internal combustion engine.

This increases the complexity of the engine and/or adversely affects the efficiency of the engine, since partial oxidation lowers the heating value of the fuel.

Accordingly, it is an object of the present invention to provide an apparatus and method of achieving hypergolic combustion by partial combustion of vaporized fuel while eliminating or substantially alleviating the tendency for coke formation.

It is another object of the present invention to provide an apparatus and method for partial combustion pretreatment of fuel which does not require regenerative extraction of the heat generated by the partial oxidation, nor resulting in a loss of engine efficiency by loss of a portion of the heat energy which is capable of being generated by the fuel.

SUMMARY OF THE INVENTION

These and other objects of the present invention are accomplished by initiating a partial catalytic combustion of the fuel to produce a characteristic activated hydrogen-rich gas at a temperature in excess of 1000° F.

This gas is at a temperature sufficiently elevated to enable hypergolic combustion as defined above, and according to the concept of the present invention, is directed into the combustion chamber of a combustion device while still at the elevated temperature.

The combustion chamber contains an oxidizing fluid atmosphere such as compressed air, and with the fuel in an activated state, ignition and combustion are immediate, with an effective recovery of all the heat energy released by the fuel, both during the partial and subsequent complete combustion stages.

At the same time, complex heat recovery devices are not required to avoid the loss of heat energy by the partial combustion.

The partial combustion process yielding the high temperature, activated, hydrogen-rich product gas does not produce significant coke formation, and accordingly advantageously allows the accomplishment of hypergolic combustion, without resulting in the problem of clogging by coke.

The process is particularly applicable to internal combustion engines, and the partially combusted gaseous fuel may be at high pressure so as to be able to be directly injected into the combustion chamber; or, alternatively each quantity may be compressed so as to be able to be injected into the engine combustion chamber.

DETAILED DESCRIPTION

In the following detailed description, certain specific terminology will be employed for the sake of clarity and particular embodiment described in accordance with the requirements of 35 USC 112, but it is to be understood that the same is not intended to be limiting and should not be so construed inasmuch as the invention may take many forms within the scope of the appended claims.

As developed in detail in the the above referenced articles, partial catalytic combustion may be generally applicable to liquid hydrocarbon fuel such as gasoline, diesel fuel, and light fuel oil. This is described in detail in these references by operation at the appropriate air-to-fuel ratios.

Activated hydrogen-rich product gas can be produced without the production of coke. Such partial oxidation can be employed with catalytic beds of designs as described therein, which may be operated for many hours without a significant reduction in catalytic efficiency. For example an air-to-fuel ratio by 5.2 may be employed when using diesel fuel and which generates product gas at a reaction temperature in excess of 1000 C. greatly exceeding the 1000° F. temperature required for hypergolic combustion.

According to the concept of the present invention, the product gas is maintained at a temperature sufficiently elevated to enable hypergolic combustion, i.e., a temperature on the order of 1000 F. or higher long enough to accomplish injection into the combustion chamber of a combustion device which combustion chamber contains an oxidizing atmosphere such as to produce substantially instantaneous ignition and complete combustion, rather than cooling the product gas for later induction into a combustion chamber device.

Figure 1:
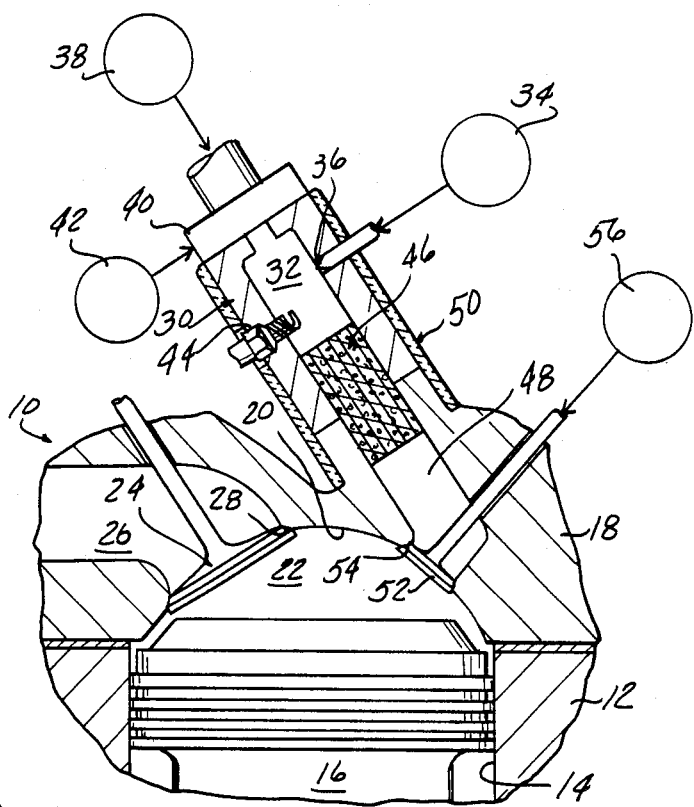
FIG. 1 is a partially sectional view of an internal combustion engine incorporating apparatus for partial catalytic combustion of the fuel to enable hypergolic combustion.

Referring to FIG. 1, an arrangement is shown for accomplishing such partial catalytic combustion in the context of an internal combustion engine 10, which includes an engine block 12 formed with a cylinder bore 14 and having a reciprocating piston 16 disposed therein. A cylinder head 18 is formed with inner surfaces 20 which together with the piston 16 and bore 14 define a combustion chamber 22. Intake valve 24 is disposed such as to be seated on valve seat 28 and controlling communication of an intake air passage 26 with the combustion chamber 22. A similar exhaust valve, valve seat and exhaust passage (not shown) are also provided to enable the products of combustion to be removed from the combustion chamber 22.

According to the concept of the present invention, a gasifier housing 30 is provided which defines a gasifier chamber 32 into which is sprayed a liquid fuel from a fuel source 34 as via a nozzle 36 such as to atomize the fuel into the gasifier chamber 32. The fuel source 34 may also include means for preheating the fuel as by means of an exhaust system heat exchanger as described in the above referenced copending patent applications.

Also provided is a source 38 of gasifier air which provides air under pressure into gasifier chamber 32 with valving means 40 operated by a air inlet valve operator 42 provided to form a much richer than stoichometric fuel-air mixture of the proportions as described in the above article references in the chamber 32.

An ignition device, such as spark plug 44 may be disposed in a chamber 32, to initiate partial combustion as the fuel-air mixture passing over catalytic bed 46 to complete a partial catalytic combustion and to form a high temperature product gas in an intake chamber 48 downstream of the catalysis bed 46. As noted the various parameters should be controlled to produce a temperature of product gas in excess of 1000° F. to reach the critical proportion of dissassociation of fuel molecules into radicals sufficient to insure hypergolic combustion.

Depending on the temperature conditions reached in the partial combustion reaction, a suitable insulating jacket 50 may also be provided surrounding the chamber 32 and catalysis bed 46 if necessary to insure that the product gases achieve the appropriate elevated temperature and maintain such temperature as the fuel is injected into the combustion chamber 22. Such injection is accomplished under the control of fuel intake valve 52 seating on the valve seat 54 controlling communication with the fuel intake chamber 48 with the combustion chamber 22. A suitable valve actuator 56 controls communication of the high pressure, high temperature fuel product gas in the intake chamber 48 with the combustion chamber 22.

A suitably controlled valve operator 56 for fuel intake valve 52 enables control over the injection event and due to the hypergolic nature of the combustion, to also control the combustion event as well.

It may be appreciated that the immediate injection of the product gas achieves both hypergolic combustion with the attendant advantages of instantaneous ignition and combustion, and also insures that the heat value of the partial catalytic combustion is contributed to the engine work out-put by expansion in the combustion chamber 22 to improve the efficiency of the engine being operated with product gas formed by a catalytic combustion gasifier arrangement.

It is noted that the system parameters may be selected such that after partial combustion, the product gas pressures in the intake fuel chamber 48 may be sufficient for injection of the product gas into the combustion chamber 22 and into the compressed air disposed in the combustion chamber 22.

Figure 2:
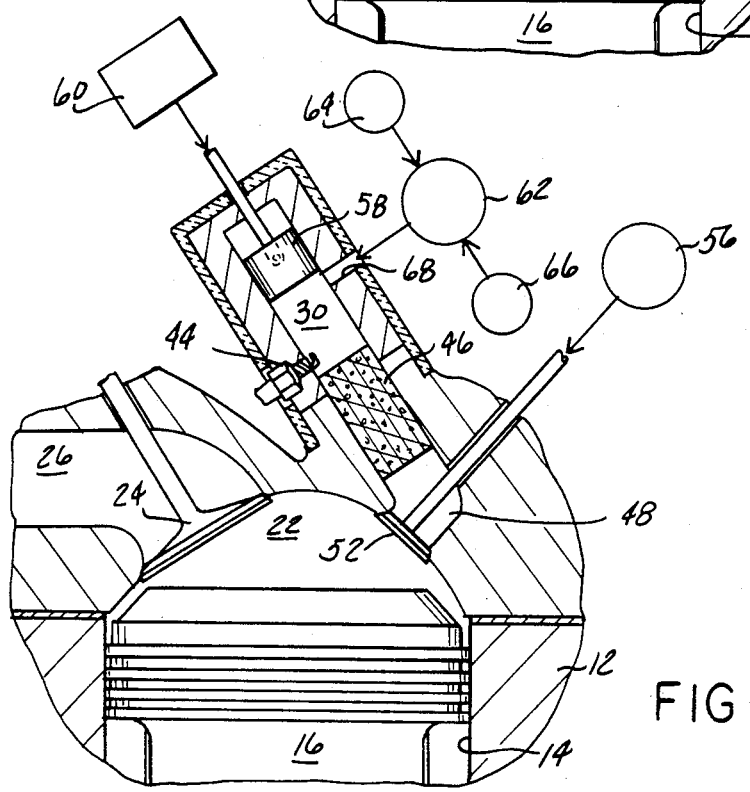
FIG. 2 is a partially sectional view of an internal combustion engine incorporating an alternate embodiment of the apparatus shown in FIG. 1 for partial catalytic combustion of fuel to enable hypergolic combustion.

Referring to FIG. 2, an alternate embodiment is depicted in which injection of a specific quantity of product gas is accomplished during each combustion cycle by means of an injection piston 58 reciprocably mounted above the catalytic combustion prechamber 30 with a drive mechanism 60 adapted to reciprocate the piston therein to compress a quantity of fuel-air mixture received from a mixing device 62.

The mixing device in turn receives preheated fuel from a fuel source 64 and air from an air source 66 which may also be preheated by means of external auxiliary heaters or heat exchange arrangements in the exhaust system of the engine 10.

A fuel-air mixture is thus produced in the mixer 62 which is then passed into the prechamber 30 through port 68 and as before a suitable spark ignition device 44 may be provided for starting of the partial catalytic combustion process. The fuel-air mixture is compressed by the injection piston 58 passing the same over the catalytic bed 46, wherein the partial catalytic combustion occurs. The product gas is then collected in the fuel intake chamber 48, with control over the passage of the compressed product gas from the intake chamber 48 into the combustion chamber 22 precisely controlled by the fuel intake valve 52 and valve operator 56.

Accordingly it can be appreciated that the above recited objectives of the present invention are achieved by the direct injection of the product gas produced from the partial catalytic combustion into the combustion chamber of a combustion device, such as the internal combustion engine shown, in that substantially hypergolic combustion can be achieved by injecting the gas produced by the partial catalytic oxidation of the fuel. This is accomplished without the production of coke such that a long life of the catalytic reactor bed is thereby enabled. At the same time a relatively simple structure is provided for both the catalytic combustion gasifier and the injection intake mechanism to be suitably adapted for application to internal combustion engines.

I claim:

1. Apparatus for pretreatment of a hydrocarbon fuel for hypergolic combustion in an oxidizing atmosphere in the combustion chamber of a combustion device comprising:
   a source of fuel;
   a source of oxidizing fluid;
   a mixing chamber for receiving oxidizer fluid from said source;
   means for directing fuel received from said fuel source into said oxidizer fluid in said mixing chamber so as to create a rich fuel-oxidizer fluid mixture therein substantially above the atoichiometric ratio;
   catalytic reactor means receiving said rich fuel-oxidizer fluid mixture from said mixture from said mixture chamber and partially catalytically combusting said mixture to form a high temperature, hydrogen-rich product gas at temperatures on the order of 1,000 degrees farenheit being thereby activated by the formation of a sufficient proportion of fuel molecules to enable hypergolic combustion thereof;
   compressor means for compressing said fuel-oxidizer mixture in said mixture chamber to allow high pressure injection into said combustion chamber;
   means controllably directing said high temperature compressed product gas in said activated state into said combustion chamber, whereby enabling hypergolic combustion therein as a result of the high temperature activated condition of said product gas.

2. A method of preheating a hydrocarbon fuel to activate said fuel sufficiently to enable hypergolic combustion in an oxidizing atmosphere in a combustion chamber of a combustion device comprising the steps of:
   forming a mixture of fuel and oxidizer fluid substantially richer than stoichometric;
   partially combusting said fuel in said mixture by passing said mixture over a catalytic reactor to produce a high temperature hydrogen rich product gas at a temperature on the order of 1000° F. or above to dissassociate a sufficiently high proportion of fuel molecules to activate said fuel so as to enable hypergolic combustion thereof;
   compressing said fuel-oxidizer fluid mixture to enable injection into the combustion chamber of a reciprocating piston internal combustion engine;
   controllably directing said activated compressed gas at said high temperatures into said combustion chamber, whereby hypergolic combustion is achieved therein.

3. Apparatus for pretreatment of a hydrocarbon fuel for hypergolic combustion in an oxidizing atmosphere in the combustion chamber of a combustion device comprising:
   a source of fuel;
   a source of oxidizing fluid;
   a mixing chamber for receiving oxidizer fluid from said source;
   means for directing fuel received from said fuel source into said oxidizer fluid in said mixing chamber so as to create a rich fuel-oxidizer fluid mixture therein substantially above the stoichiometric ratio;
   catalytic reactor means receiving said rich fuel-oxidizer fluid mixture from said mixture from said mixture chamber and partially catalytically combusting said mixture to form a high temperature, hydrogen-rich product gas at temperatures on the order of 1,000 degrees farenheit being thereby activated by the formation of a sufficient proportion of fuel molecules to enable hypergolic combustion thereof;

means controllably directing said high temperature product gas in said activated state into said combustion chamber, whereby enabling hypergolic combustion therein as a result of the high temperature activated condition of said product gas.

4. The apparatus according to claim 3 wherein said combustion device comprises a reciprocating piston internal combustion engine, and wherein said oxidizer fluid and fuel sources provide oxidizer fluid and fuel at elevated pressures enabling injection into said combustion chamber of said engine.

5. The apparatus according to claim 3 wherein said means for controllably directing said high temperature product gas includes valve means operable to control the flow of said gas into said combustion chamber.

6. A method of preheating a hydrocarbon fuel to activate said fuel sufficiently to enable hypergolic combustion in an oxidizing atmosphere in a combustion chamber of a combustion device comprising the steps of:

forming a mixture of fuel and oxidizer fluid substantially richer than stoichometric;

partially combusting said fuel in said mixture by passing said mixture over a catalytic reactor to produce a high temperature hydrogen rich product gas at a temperature on the order of 1000° F. or above to dissassociate a sufficiently high proportion of fuel molecules to activate said fuel so as to enable hypergolic combustion thereof;

controllably directing said activated gas at said high temperatures into said combustion chamber, whereby hypergolic combustion is achieved therein.

7. The method according to claim 6 wherein an oxidizer fluid to fuel mass ratio is selected to minimize coke formation.

8. The method according to claim 6 wherein said air and fuel are mixed at high pressures to enable injection into the combustion chamber of a reciprocating piston internal combustion engine.

* * * * *

UNITED STATES PATENT AND TRADEMARK OFFICE
CERTIFICATE OF CORRECTION

PATENT NO. : 4,651,703

DATED : March 24, 1987

INVENTOR(S) : Lyle O. Hoppie

It is certified that error appears in the above-identified patent and that said Letters Patent is hereby corrected as shown below:

Column 2, line 49, "in each" should be --each of which are hereby incorporated by--.

Column 4, line 9, "by" should be --of--.

Column 6, line 13 (Claim 1), "atoichiometric" should be --stoichometric--.

Signed and Sealed this

Third Day of November, 1987

Attest:

DONALD J. QUIGG

Attesting Officer

Commissioner of Patents and Trademarks